Oct. 9, 1923.
A. H. KUTSCHE
1,470,452
SPRING WHEEL
Filed Sept. 23, 1921
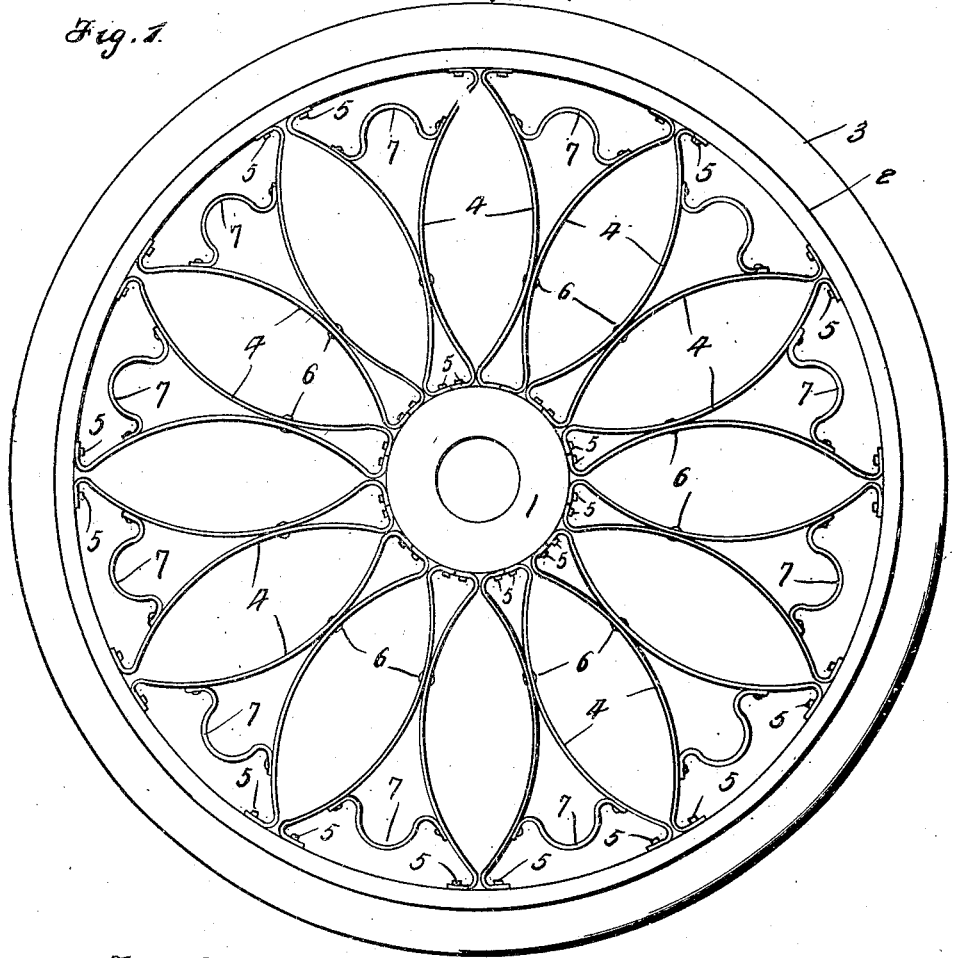
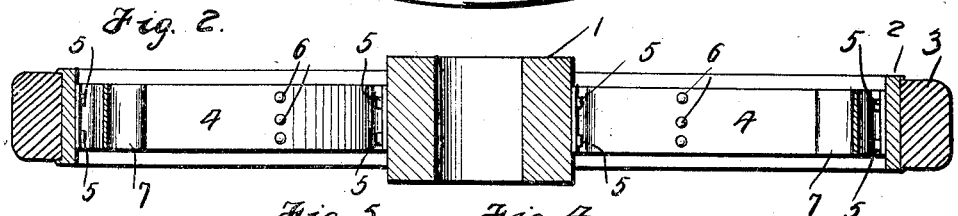
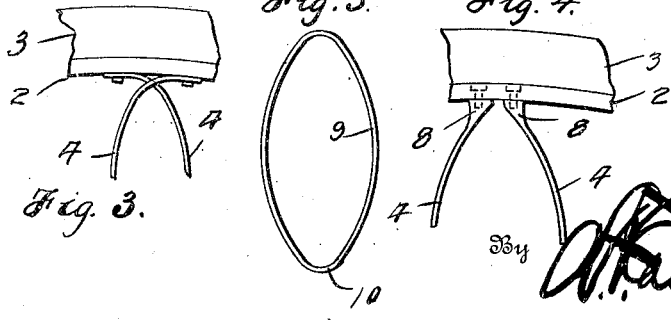
Inventor
A. H. Kutsche.

Patented Oct. 9, 1923.

1,470,452

UNITED STATES PATENT OFFICE.

ARTHUR H. KUTSCHE, OF MONROE, MICHIGAN.

SPRING WHEEL.

Application filed September 23, 1921. Serial No. 502,754.

*To all whom it may concern:*

Be it known that I, ARTHUR H. KUTSCHE, a citizen of the United States, residing at Monroe, in the county of Monroe and State of Michigan, have invented certain new and useful Improvements in Spring Wheels; and I do hereby declare the following to be a full, clear, and exact description of the invention, such as will enable others skilled in the art to which it appertains to make and use the same.

This invention relates to new and useful improvements in spring wheels for vehicles and has for its primary object the provision of resilient spokes between the hub and rim to provide an easy and comfortably riding wheel by absorbing shocks and jars and to permit the use of a solid tire with the easy riding qualities obtained from a pneumatic tire without any of the disadvantages accompanying the latter.

Another object of this invention is the provision of a spring wheel of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation illustrating a spring wheel constructed in accordance with my invention, Figure 2 is a sectional view illustrating the same, Figure 3 is a detail view illustrating a modified form of my invention, Figure 4 is a similar view illustrating another modified form of my invention.

Figure 5 is a detail view drawn on a small scale illustrating another modified form of spoke.

Referring in detail to the drawings, the numeral 1 indicates a hub and 2 a rim on which a solid tire 3 is mounted. The hub is connected to the rim by resilient spokes 4 to absorb shocks and jars incident to the wheel passing over uneven roadway and obstacles. The spokes 4 may be of any number suitable for the purpose and are in the form of leaf springs which are arcuately curved from one end to the other and preferably are arranged in pairs and have their ends bent angularly and secured to the hub and rim by bolts 5 or similar fasteners. The spring spokes of each pair are arranged so that their curves extend in opposite directions and are connected with each other and are secured together in any suitable manner as shown at 6 and at a point intermediate their ends. The spring spokes of each pair are connected with each other adjacent their outer ends by auxiliary springs 7 that are substantially U-shaped or bowed and have their ends angularly related and secured to the respective spring spokes to reinforce and strengthen the latter. By having the spring spokes of each pair connected, they support each other and move or work in unison to provide a wheel of increased strength and durability.

In Figure 3 I have shown another way in which the spokes may be secured to the rim and hub. The ends of the spokes continue substantially at the same curve as the major portions of said spokes and the ends of each pair of spokes extend across each other and are secured to the rim and hub by bolts or similar fasteners.

The modified form of my invention shown in Figure 4 shows the spokes having their ends enlarged as shown at 8 and provided with screw threaded sockets to receive stud bolts after the latter pass through the rim or hub.

In Figure 5 is shown a modified form of spoke 9 which is of elliptical shape and is adapted to have its restricted portions or ends 10 fastened in any suitable manner to the hub and rim or felly of the wheel.

While I have shown and described the preferred embodiment of my invention, it will be understood that minor changes in construction, combination, and arrangement of parts may be made without departing from the spirit and scope of the invention as claimed.

Having thus described my invention what I claim is:—

A resilient wheel having a hub, a rim, pairs of resilient spokes connecting the hub and rim, the spokes of each pair being bowed outwardly from a radial line passing between them, the spokes of adjacent pairs being in direct contact about the wheel, the terminals of each pair of spokes at the hub ends extending in opposite directions externally and about the periphery of the hub, fastenings passing through said terminals and into the hub, the said terminals of the different pairs contacting at their free end edges with each other, and auxiliary bowed springs relatively close to the rim out of contact therewith and connecting the spokes of adjacent pairs.

In testimony whereof I affix my signature in presence of two witnesses.

ARTHUR H. KUTSCHE.

Witnesses:
   Robt. C. Meier,
   Eugene E. Steiner.